US007527274B2

(12) United States Patent
Strauss et al.

(10) Patent No.: US 7,527,274 B2
(45) Date of Patent: May 5, 2009

(54) PIVOTING SLAB CART

(75) Inventors: Art Strauss, Downers Grove, IL (US); Wayne Oksanen, Oak Forest, IL (US)

(73) Assignee: Midway Industries, Bedford Park, IL (US)

( * ) Notice: Subject to any disclaimer, the term of this patent is extended or adjusted under 35 U.S.C. 154(b) by 351 days.

(21) Appl. No.: 11/389,789

(22) Filed: Mar. 27, 2006

(65) Prior Publication Data

US 2007/0221592 A1    Sep. 27, 2007

(51) Int. Cl.
*B62D 39/00* (2006.01)
(52) U.S. Cl. ............................ 280/33.991; 280/79.11; 280/79.3; 280/62; 211/41.14; 211/41.15
(58) Field of Classification Search ............ 280/33.991, 280/79.11, 79.3, 62; 211/41.14, 41.15
See application file for complete search history.

(56) References Cited

U.S. PATENT DOCUMENTS

| 3,838,779 | A | * | 10/1974 | Dawson | ...................... 414/778 |
| 5,584,399 | A | * | 12/1996 | King | ...................... 211/41.15 |
| 6,109,625 | A | * | 8/2000 | Hewitt | ...................... 280/43.24 |
| 6,220,611 | B1 | * | 4/2001 | Shapiro | ...................... 280/47.34 |
| 6,511,082 | B2 | * | 1/2003 | Shirai | ...................... 280/79.11 |
| 6,843,625 | B2 | * | 1/2005 | Hewitt | ........................ 410/66 |
| 7,004,483 | B1 | * | 2/2006 | McEntee | ................. 280/47.35 |
| 7,163,214 | B1 | * | 1/2007 | Bratton, Sr. | .............. 280/79.11 |
| 7,328,907 | B1 | * | 2/2008 | Bileth | ...................... 280/79.11 |

FOREIGN PATENT DOCUMENTS

| JP | 2006-168444 | A |   | 6/2006 |
| JP | 2006168444 | A | * | 6/2006 |

* cited by examiner

*Primary Examiner*—Paul N Dickson
*Assistant Examiner*—Michael R Stabley
(74) *Attorney, Agent, or Firm*—Hughes Socol Piers Resnick & Dym, Ltd.

(57) ABSTRACT

A cart is described and claimed. The cart is used for moving an delivering large planar objects to an object receiving table having a substantially flat, horizontal surface. The cart has a base and a rack removably mounted atop the base. The base includes a pivot structure for pivotally fixing the base at a predetermined location, and at least one (preferably three) wheeld base mechanisms arranged to permit the base structure to pivot about that pivot structure into and out of a delivery position in which the rack bottom is located substantially coplanar with and adjacent to the top of the object receiving table.

8 Claims, 3 Drawing Sheets

PIVOTING SLAB CART

FIELD OF THE INVENTION

The present invention is in the field of transportation devices. In particular the present invention related to a slab cart that pivots on one of four legs while the other legs have swiveling wheels. The pivoting cart is useful for positioning sheets of glass, slabs of stone, or any heavy objects of various sizes and weights so that they can be tipped onto a horizontal table for cutting or other processing.

BACKGROUND OF THE INVENTION

Transporting and positioning any heavy object poses a variety of problems and challenges in view of the weight, size, and potential breakage of the material. The large and unwieldy nature of a typical sheet of glass requires that the sheet be supported in an upright position during transport in order to prevent cracking and/or breaking.

Typically, manufactured sheets of glass are transported from a manufacturing facility to a "finishing" facility for final preparations including cutting, heating, tempering, laminating, glazing, sealing, etc. Once manufactured, the sheets of glass are loaded onto a truck for transport to the finishing facility. The sheets of glass are placed in a crate and the crate is placed onto the truck in an upright or slightly leaning position. At the finishing facility, the rack holding the sheets of glass are removed onto a dolly, in an upright position, and maneuvered in and around the facility to the cutting and glass receiving finishing table. It is often difficult to find a suitable means for supporting sheet glass in an upright position during rolling and for maintaining upright stability when obstacles at the worksite are encountered. Furthermore, it is difficult to remove or tip the sheets of glass, for example, from the dolly rack and place them flat onto a cutting and/or finishing table without cracking or breaking the glass.

For safety reasons, manufactured sheets of glass should always be transported in an upright position, as stacking sheet glass vertically can cause dangerous cracks. Glass should never be stood on a hard floor such as concrete; such placement can start cracks in the glass. The application of uneven forces to a manufactured sheet of glass will cause it to shatter or crack.

In view of the foregoing issues related to the transport of heavy, slab-like objects, it is an object of this invention to provide an apparatus for transferring the objects from one location to another within a facility without the risk of breaking the object. For example, as described above, sheet glass is especially prone to cracking and breaking if not handled properly. The critical stage during the manufacturing and finishing process is transport and tipping from the delivery truck to the finishing table. The finishing table is very stable and of a specific height. In many circumstances, if the dolly or trolley crate bottom is not in proper alignment with the finishing table; or the bottom edge of a glass sheet while resting on the dolly crate is not parallel to the surface of the table; or the resting surface of the dolly, upon which the glass sheet rests, is not at least as high as the surface of the finishing table; the glass manipulator will risk not having the glass sheet fall evenly onto the table (FIG. 5) and will therefore be especially prone to cracking and breaking.

It is another object of the present invention to provide for a glass sheet transport apparatus having and lateral supports to stabilize the sheet or slab-like object in the upright position.

It is yet another object of this invention to provide a pivotable transport apparatus, wherein the height ($H_R$) of the apparatus platform rack or crate (70), on which the glass sheets are resting, is of a customized height wherein the height is aligned to be coplanar with the height ($H_T$) of the finishing table (60), thereby allowing the glass sheet to fall (75) onto the finishing table without cracking or breaking. An associated object is to provide a transport apparatus which eliminates or minimizes safety concerns associated with the need to manually handle heavy and unwieldy racks of glass so as to precisely position the glass sheets for manufacturing, finishing or other activity.

It is another object of this invention to provide a pivotable transport apparatus having one stationary leg on which the apparatus can pivot and at least two other legs having swivel casters upon which the apparatus can move or swing from one locale to another. An associated object is to provide a transport apparatus which reduces the factory floor space required to replenish materials being cut or otherwise consumed. Yet another associated object is to provide a transport apparatus which reduces lost production time encountered when material being consumed is replenished.

Other objects and advantages of the invention will become apparent upon reading the following detailed description and upon reference to the drawings. Throughout the drawings, like reference numerals referred to like parts.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention as defined by the appended claims.

Figure 1:
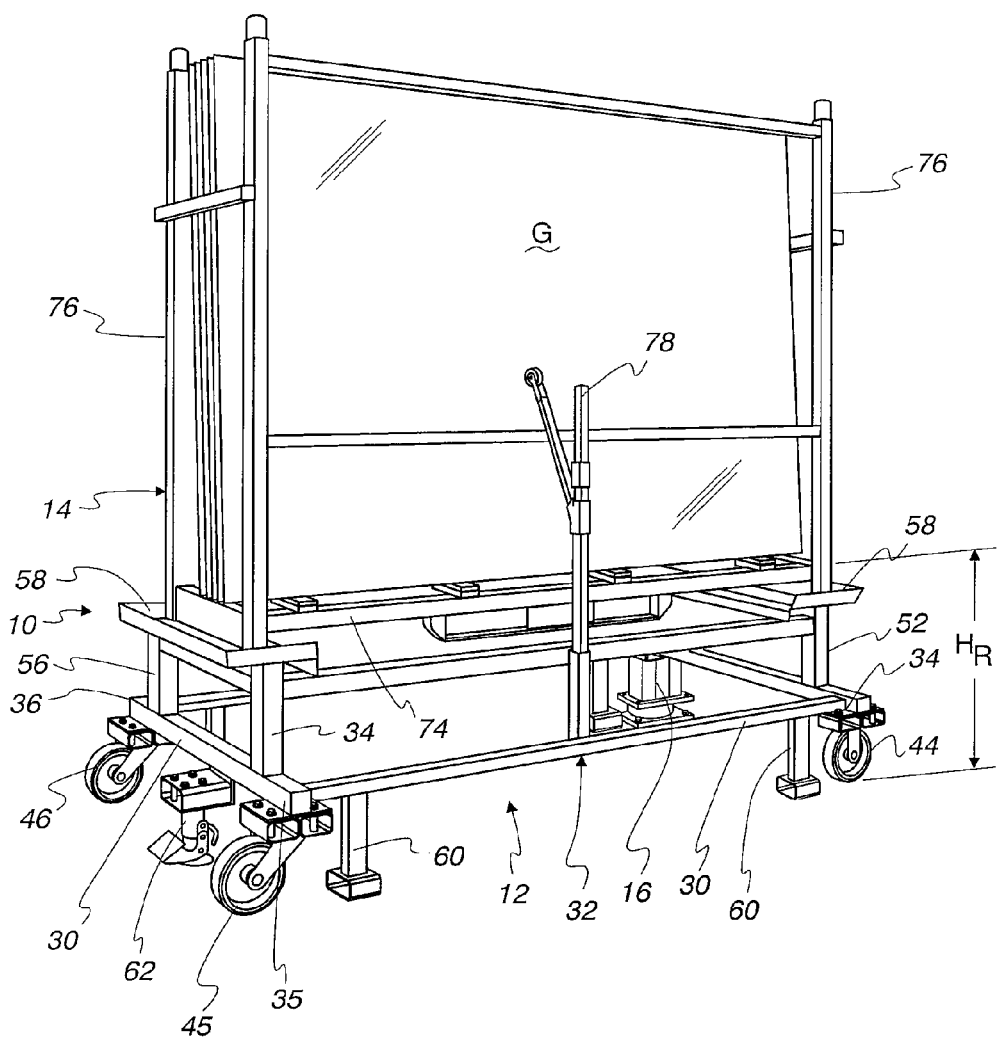
FIG. 1 is an isometric view of a preferred embodiment of the slab cart.

Turning first to FIG. 1, there is shown a slab cart 10 generally comprising a base 12 and a removable or detachable rack 14. As shown in FIGS. 1 and 6, the base includes a base pivot mechanism or structure 16 for pivotally fixing the base 12 to a factory floor 18 at a predetermined location adjacent an object receiving table 20 (FIG. 5).

The base 12 can be assembled from any suitably strong materials such as structural steel. These steel elements 30 can be made from hollow rectangular tubing (AISC Shape TS) and can be welded or otherwise assembled into a rectilinear shape such as that illustrated.

Figure 4:
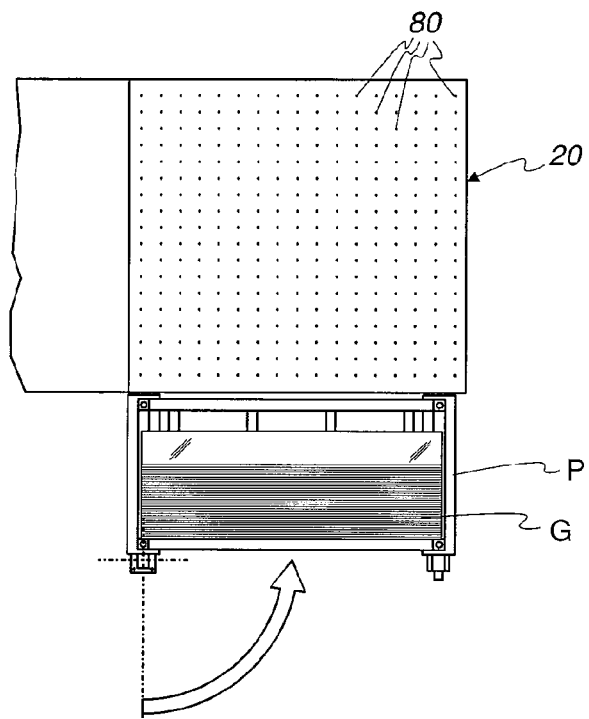
FIG. 4 is a plan view showing the slab cart and an adjacent object receiving table.
Figure 5:
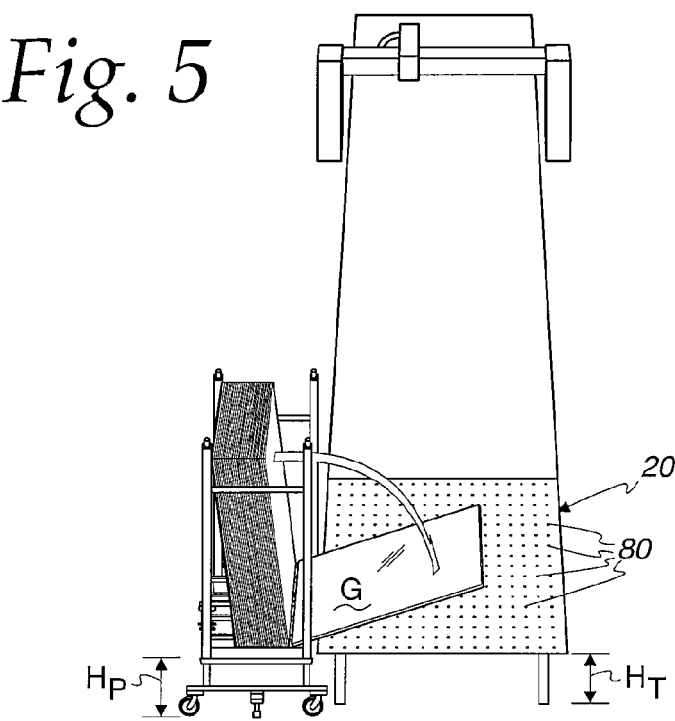
FIG. 5 is a perspective view in schematic format showing the slab cart and object receiving table as they appear when an object is being delivered from the slab cart to the table.
Figure 6:
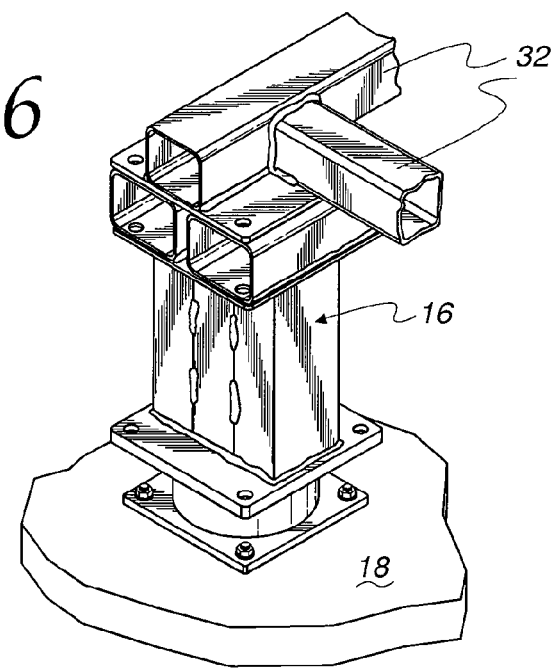
FIG. 6 is an isometric view of the slab cart fixed pivot mechanism.

As suggested in FIGS. 1 and 6, and in accordance with the invention, one corner of the cart base 32 is affixed to the pivot mechanism 16, and the other three corners 34, 35 and 36 are each equipped with wheeled caster devices 44, 45 and 46 to enable and permit the base structure 12 to pivot about the pivot structure 16 over the factory floor 18 so that the cart 10 can be swung into and out of a delivery position in which the bottom of the rack 14 is located substantially coplanar with and adjacent to an object receiving table 50 (FIGS. 4 and 5). As suggested in FIG. 1, the base 12 can include risers 52, 54 and 56 upon which are located rack-supporting structure 58. Weight-bearing structure 60 can be provided if desired. A brake device 62, which can take the form of a foot brake, can also be provided for locking and securing the cart 10 in any desired position along its locus of travel.

Figure 2:
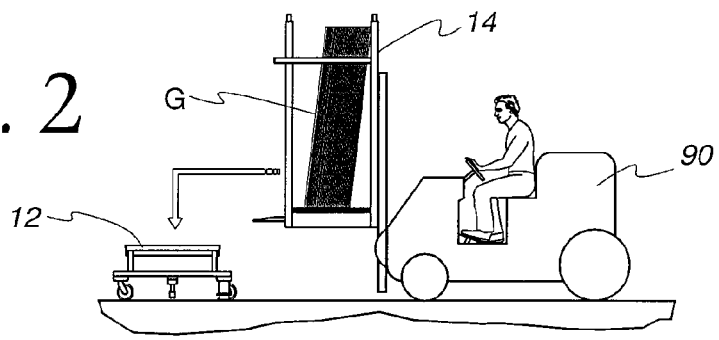
FIG. 2 is an elevational view in schematic format showing the slab cart base and rack as the rack is being delivered to and mounted upon the base by a forklift truck.
Figure 3:
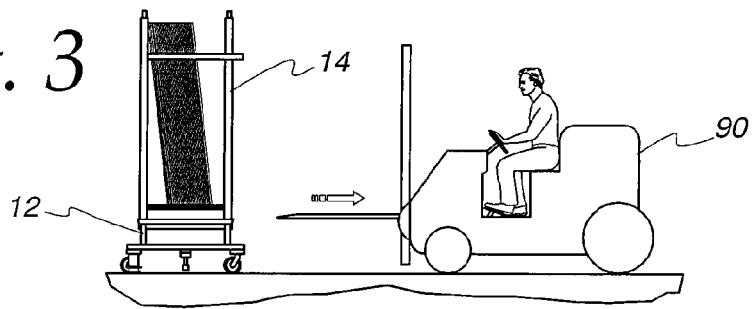
FIG. 3 is an elevational view in schematic format similar to FIG. 2 showing the slab cart supporting large planar objects and the forklift truck withdrawing from engagement with the slab cart rack.

The rack 14 can be formed of other similar steel shapes, and includes a bottom frame 74 adapted to be supported by the cart base support elements 58. Extending upwardly from the base support 74 are a series of support elements 76 comprising a support frame which is sized and adapted to closely enclose the objects G. It is these objects G which are to be delivered to the object receiving table 20 (FIGS. 4 and 5), and to this end, the objects are supported in a substantially horizontally stacked array, as suggested in FIGS. 1, 2 and 3. Here these objects G are large slabs of plate glass. One or more retainer devices 78 may be mounted upon the cart, as shown in FIG. 1, so as to prevent the plate glass slabs G from accidentally falling or being dislodged from the cart 10.

In accordance with one of the objects of the invention, the base and rack bottom frame have an aggregate vertical height $H_R$ which is substantially equal to the height $H_T$ of an object receiving table 20. Thus, as objects G are delivered to the object receiving table 20 by tipping them from the rack bottom 74 to the object receiving table 20 as suggested in FIG. 5, the tipped objects fall upon the object receiving table 20 in a configuration which is substantially coplanar and flat in relationship to the object receiving table 20. In the illustrated embodiment, the object receiving table 20 is equipped with an air delivery system (not shown), terminating in a series of delivery jets 80 (FIGS. 4 and 5) which provide a low-pressure cushion of air immediately above the table 20. As the tipped objects G fall upon the table in coplanar configuration with the table, the jetted air cushions the fall and impact of the object G upon the table 20.

When all the objects G have been delivered from the cart can to the receiving table 20, the carts 10 is pivoted away from the table 20 and the empty rack 14 is removed by a forklift truck or other convenient means.

Delivery of a new rack 14 to the cart base 12 can be accomplished in easy and efficient manager as suggested in FIGS. 2-5. A new rack 14 filled with objects G can be picked up by a forklift truck 90 or other convenient device, and can be easily delivered to and placed upon the cart base 12 as suggested in FIG. 2. Once the rack 14 has been lowered into place upon the cart base 12, the forklift truck 90 withdraws (FIG. 3), and the cart 10 is then pivoted into its object delivering position P wherein the rack bottom frame is located in a position closely adjacent an edge of the object receiving table 20 as shown in FIG. 4.

The invention claimed is:

1. A cart for moving and delivering large planar objects, comprising, in combination:

a rack, a rack bottom frame;

a generally rectangular base adapted to at least selectively mount the rack bottom frame and having at least four base corners;

at least three caster wheels mounted to a respective three of the base corners;

and a pivot structure affixed at a stationary point on the floor and being capable of pivoting connection to the fourth corner of said base;

said base and rack bottom frame having an aggregate vertical height substantially equal to the height of an object receiving table so that, as objects are delivered to the object receiving table by tipping them from the rack bottom to the object receiving table, the tipped objects fall upon the object receiving table in a configuration which is substantially coplanar and flat in relationship to the object receiving table.

2. A cart according to claim 1 wherein said rack bottom frame is adapted to be supported by said cart base, and wherein said cart further includes a support frame adapted to support said large planar objects in a substantially vertically oriented but substantially horizontally stacked array.

3. A cart according to claim 1 wherein said pivot structure is located adjacent an object receiving table at a predetermined position so that the rack bottom frame can be swung into a position closely adjacent an edge of the object receiving table.

4. A cart according to claim 1 wherein said rack is adapted to be engaged by and lifted by a forklift truck.

5. A cart for moving and delivering large planar objects to an object receiving table of predetermined height, the cart comprising, in combination a base and a rack and a support frame adapted to support planer objects planar objects in a substantially vertically oriented by substantially horizontally stacked array, the rack having a rack bottom, the base being adapted to be pivotally affixed at a predetermined position adjacent to the object receiving table so that the cart can be swung into and out of a delivery position in which the rack bottom is located substantially horizontally coplanar with and adjacent to the object receiving table so that objects can be delivered to the object receiving table by tipping them from the rack bottom to the object receiving table, the tipped objects falling upon the object receiving table in a configuration which is substantially coplanar and flat in relationship to the object receiving table.

6. A cart according to claim 5 wherein said rack is selectively detachable from said base.

7. A cart according to claim 5 wherein said rack is adapted to be engaged by a forklift truck.

8. A cart according to claim 5 wherein said cart rack is adapted to receive, support and deliver large, thin planar objects in said substantially horizontal array.

* * * * *